United States Patent [19]

Arendt

[11] 4,374,117

[45] * Feb. 15, 1983

[54] PREPARATION OF ULTRAFINE BAZRO$_3$

[75] Inventor: Ronald H. Arendt, Schenectady, N.Y.

[73] Assignee: General Electric Company, Schenectady, N.Y.

[*] Notice: The portion of the term of this patent subsequent to Nov. 11, 1997, has been disclaimed.

[21] Appl. No.: 320,367

[22] Filed: Nov. 12, 1981

[51] Int. Cl.$^3$ ............................................. C01G 23/00
[52] U.S. Cl. .............................. 423/593; 423/DIG. 12
[58] Field of Search ....................... 423/593, DIG. 12

[56] References Cited

U.S. PATENT DOCUMENTS 4,293,534  10/1981  Arendt ................................ 423/593
4,293,535  10/1981  Arendt ................................ 423/593

OTHER PUBLICATIONS

Beck et al., "APC Published Application, S.N. 393258, 292742", Jul. 13, 1943.

Primary Examiner—Herbert T. Carter
Attorney, Agent, or Firm—Jane M. Binkowski; James C. Davis, Jr.; James Magee, Jr.

[57] ABSTRACT

A particulate mixture of an alkali metal hydroxide solvent, barium oxide in excess of stoichiometric amount, and zirconium oxide in about stoichiometric amount, is heated to melt the hydroxide solvent in which the barium oxide and zirconium oxide dissolve and react precipitating ultrafine barium meta-zirconate ($BaZrO_3$).

3 Claims, No Drawings

PREPARATION OF ULTRAFINE BaZrO$_3$

The present invention relates to the preparation of small crystallite size barium meta-zirconate (BaZrO$_3$) powder.

Conventionally, barium meta-zirconate powder is prepared by the high temperature solid state reaction of appropriate precursor compounds. The reaction product is in the form of relatively large, strong self-bonded particle aggregates which must be comminuted to the desired approximately 1.0 micron particle size before fabrication into ceramic articles.

One of the inadequacies of this conventional procedure is that the product, in commercial practice, is not fully reacted to yield uniform stoichiometry on a microscopic level. In cases where the physicochemical properties depend on the composition and its uniformity, the nonuniform composition of the conventional product can lead to less than optimum properties. Although procedures can be adopted in the conventional process to minimize these variations, the penalty in additional effort can be considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten salt solvent with subsequent precipitation of the product which does not require comminution. In the present process, the reactants are slightly soluble in the molten hydroxide solvent, therefore allowing literally atomic mixing in the liquid phase of the reactants. The solubilities of the reactants are such that they exceed the corresponding solubilities determined by the solubility product of the product in the molten hydroxide solvent. Hence, the reaction product precipitates spontaneously from the molten hydroxide solution. The reactants will continually dissolve to maintain a reactant-saturated solution until they are totally consumed by product formation.

Preferably, the reaction temperature in the present process is that required to attain reasonable reaction rates in the molten hydroxide solvent, but it can be significantly lower than in the corresponding conventional solid state synthesis. Similarly, the reaction time can be as short as about 30 minutes or shorter compared with several hours for solid state reaction.

The following copending U.S. patent applications are assigned to the assignee hereof and are incorporated herein by reference:

U.S. Pat. No. 4,293,535 to Arendt for MOLTEN SALT SYNTHESIS OF ALKALINE EARTH ZIRCONATE POWDER discloses a process consisting essentially of forming a mixture of an alkali metal chloride solvent salt, zirconium oxide and an alkaline earth reactant selected from the group consisting of barium oxide, strontium oxide, and mixtures thereof, and heating the resulting mixture to melt the chloride salt solvent in which the zirconium oxide and alkaline earth reactant dissolve and react precipitating a zirconate selected from the group consisting of barium zirconate, strontium zirconate and mixtures thereof. U.S. Pat. No. 4,293,535 specifically discloses the preparation of a phase pure BaZrO$_3$ with a spherical equivalent average crystal diameter of ~0.23 microns.

U.S. Pat. No. 4,293,534 to Arendt for MOLTEN SALT SYNTHESIS OF ALKALINE EARTH TITANATES, ZIRCONATES AND THEIR SOLID SOLUTIONS discloses a process consisting essentially of forming a particulate mixture of an alkali metal hydroxide solvent, a reactant selected from the group consisting of titanium oxide, zirconium oxide and mixtures thereof, and an alkaline earth reactant selected from the group consisting of barium oxide, strontium oxide, and mixtures thereof, and heating the resulting mixture to melt the alkali metal hydroxide solvent in which the reactants dissolve and react precipitating a titanate, zirconate or solid solutions thereof. U.S. Pat. No. 4,293,534 specifically discloses the preparation of a phase pure BaZrO$_3$ with a spherical equivalent average crystal diameter of ~0.346 micron.

Both patents disclose that BaO and ZrO$_2$ should be used in at least stoichiometric amount to prepare BaZrO$_3$, and that the product powders are free-flowing and can be in the form of aggregates or in the form of individual powder crystals, but usually that it is a mixture of both, that the aggregates which range in size from about 1 micron to about 20 microns, are particles consisting essentially of a cluster of smaller sized crystals weakly bonded together autogeneously, i.e. such bonding is believed to be caused by Van der Waal's forces or by self-bonding, i.e. neck growth between grains, and that the individual grains range up to about 1 micron in size and usually are submicron.

Also, both patents disclose that amounts of BaO and/or SrO in excess of stoichiometric results in the introduction of a secondary phase in the product, i.e. Ba$_3$Ti$_2$O$_7$ and Sr$_3$Ti$_2$O$_7$, or Ba$_3$Zr$_2$O$_7$ and Sr$_3$Zr$_2$O$_7$, and that, generally, the amount of this secondary phase increases with increasing excess amounts of the oxides of barium and strontium. However, it has been now determined, after extensive experimentation, that Ba$_3$Zr$_2$O$_7$ is rarely observed and then only at minumum detectable levels.

Although BaZrO$_3$ is a highly retractory material, it possesses sufficient solubility in the present molten solvent to produce crystals having a spherical equivalent average diameter ranging from 0.15 to 0.50 micron. The present invention opposes this growth tendency by suppressing the solubility of the product in the reaction medium, thereby possibly enhancing the nucleation rate as well, and allowing the retrieval of a significantly smaller sized product.

In contrast to the disclosure of both cited patents, the present invention utilizes BaO in a specific amount in excess of stoichiometric and ZrO$_2$ in about stoichiometric amount to produce ultrafine phase-pure BaZrO$_3$ powder having a spherical equivalent average diameter ranging up to 0.15 micron and preferably, from about 0.01 micron up to 0.10 micron.

Briefly stated, the present process for producing BaZrO$_3$ powder consists essentially of providing barium oxide in an amount ranging from about 10 mole % to about 50 mole % in excess of stoichiometric amount or precursor therefor, providing zirconium oxide in about stoichiometric amount or precursor therefor, providing an alkali metal hydroxide selected from the group consisting of sodium hydroxide, potassium hydroxide and mixtures thereof, forming a mixture of said barium oxide or precursor therefor, said zirconium oxide or precursor therefor and said hydroxide solvent, heating said mixture to a reaction temperature ranging from about 980K to about 1375K, said hydroxide solvent being in molten form at said reaction temperature and being a solvent for said barium oxide and said zirconium oxide, each said precursor decomposing completely at or below said reaction temperature to form said oxide and by-product gas, maintaining said reaction temperature dissolving and reacting barium oxide and zirconium oxide in said molten solvent and precipitating $BaZrO_3$ and recovering said precipitated $BaZrO_3$.

The reaction for producing the present barium zirconate is as follows:

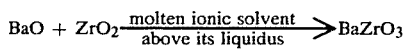

$$BaO + ZrO_2 \xrightarrow[\text{above its liquidus}]{\text{molten ionic solvent}} BaZrO_3$$

BaO is used in an amount ranging from about 10 mole % to about 50 mole % in excess of stoichiometric amount. Amounts of BaO less than about 10 mole % in excess of stoichiometric amount will not produce the present ultrafine powder. On the other hand, amounts of BaO higher than about 50 mole % in excess of stoichiometric amount are likely to freeze the effective solvent. $ZrO_2$ must be used in or about stoichiometric amount, and an amount significantly outside stoichiometric will not produce the present ultrafine powder.

The present process produces $BaZrO_3$. Since the crystallites of $BaZrO_3$ are produced by precipitation from a saturated solution, they are chemically homogeneous, i.e. they are of uniform composition on a microscopic level. Also, since the present crystallites have a spherical equivalent average diameter ranging up to 0.15 micron, they do not require any crushing or grinding operations with their attendant contamination with impurities from the equipment employed before they can be fabricated into useful ceramic articles. Also, the present crystallites are roughly cubic.

In carrying out the present process, the oxides or precursors therefor can be of commercial or technical grade, and their particular purity depends largely on the particular application of the resulting $BaZrO_3$. Specifically, the oxides should not contain any impurities which would have a significantly deleterious effect on the resulting $BaZrO_3$ powder or on its particular application.

The oxides or precursors therefor, if not admixed in solution form, should be of a size which allows the reaction to take place. BaO, for example, is soluble in water and can be admixed as an aqueous solution, if desired. Generally, the oxides or precursors therefor are used and are satisfactory in the particle size range in which they are available commercially, which ordinarily ranges from submicron up to about 1000 microns. The powders also should be free of large, hard aggregates, i.e. significantly above 1000 microns in size, which might survive the mixing process and prevent sufficient reactant contact for satisfactory reaction rates.

In the present process the hydroxide solvent is selected from the group consisting of sodium hydroxide, potassium hydroxide and mixtures thereof. The hydroxide solvent is used in a minimum amount of at least about 20% by weight of the total amount of component oxides and hydroxide solvent, and typically about 50% by weight. Amounts of hydroxide lower than about 20% by weight are not practical since the desired reaction will not proceed. There is no upper critical maximum amount of hydroxide, but amounts of hydroxide higher than about 80% by weight of the total amount of component oxides and hydroxide solvent provide no significant advantage.

The oxides or precursors therefor and the alkali hydroxide solvent are admixed to produce a substantially thorough mixture to insure good contact and complete reaction. The actual mixing operation can be carried out in several ways which do not introduce undesirable impurities into the resulting product. Preferably, water at room or ambient temperature is admixed with the oxides or precursors therefor and the hydroxide solvent in an amount which, with stirring, is at least sufficient to form a slurry. The wet mixing can be carried out, for example, using a plastic milling medium or by wet mixing in a high speed blender with preferably distilled or deionized water, depending on the application of the resulting product and preferably, with stainless steel or plastic stirrers, for example, a propeller, in a stainless steel or plastic, preferably Teflon, lined vessel.

The reaction temperature ranges from about 980K to about 1375K. At reaction temperature NaOH, KOH and all mixtures thereof are molten.

Temperatures higher than about 1375K are likely to vaporize the molten hydroxide significantly.

As a practical limit, $\sim$1273K was found to be the upper bound in terms of maintaining an effective reaction medium. Particularly preferred is a reaction temperature ranging from about 1000K to about 1250K since it is not difficult to maintain and provides high reaction rates without significant vapor loss of the molten solvent.

At reaction temperature the hydroxide is molten and the oxides dissolve and react in the molten hydroxide precipitating $BaZrO_3$. Specifically, the amount of BaO in excess of stoichiometric provides sufficient $Ba^{+2}$ ions in the solvent to produce a reaction medium which suppresses the solubility of $BaZrO_3$ therein resulting in the present ultrafine powder. The reaction temperature is maintained until the reaction is completed. The particular period of reaction time depends largely on reaction temperature as well as the amount of hydroxide solvent used and is determinable empirically. Reaction time is a strong function of the reaction temperature used, varying in an inverse fashion. For a reaction temperature of about 980K, the minimum reaction time is about 5 hours. When the reaction is completed, the reacted mass is cooled at any convenient rate, preferably in air and preferably to about room temperature. The cooled $BaZrO_3$-containing reacted mass is a solid, fired cake comprised of $BaZrO_3$ particles distributed throughout a matrix of solidified solvent and BaO. Specificallly, $BaZrO_3$, which is maintained as distinct second phase crystallites, is present as fine crystallites embedded in the hydroxide matrix.

The $BaZrO_3$ can be recovered by a number of techniques. Preferably, the $BaZrO_3$-containing reacted mass is contacted and admixed with dilute aqueous acetic acid, preferably having a pH of about 4 to 5, in an amount sufficient to react quantitatively with the excess barium component to produce barium acetate which is soluble in the acetic acid. The acetic acid also converts the hydroxide of potassium or sodium to the corresponding acetate which also is soluble in the aqueous acetic solution leaving the present $BaZrO_3$ powder dispersed in an aqueous solution of acetates. A flocculating agent which is organic and soluble in water, preferably an anionic flocculant, is added in an amount which is sufficient to flocculate and settle the $BaZrO_3$ powder. Preferably, the flocculating agent is added in aqueous solution, about 0.1 gram of flocculant per 100 grams of water usually being satisfactory, and preferably the flocculating agent is used only in an amount necessary to settle the powder. The supernatant liquid is then decanted.

Preferably, after several washings with water and settings with flocculating agent and decantations of the supernatant liquid, the wet powder is dried. For production of barium zirconate powder of high purity, the flocculating agent should be completely removable by heating the powder in air at temperatures below the melting point of the powder and preferably not higher than about 1073K. Preferably, to remove any remaining water and flocculant, it is heated at about 523K for about 20 minutes.

Alternatively, in the present process, if desired, a particulate inorganic precursor of BaO or $ZrO_2$ can be used. The precursor should decompose completely to form the oxide and byproduct gas or gases leaving no effective contaminants in the reacted mass. Representatives of the precursors of the reactant oxides useful in the present process are the carbonates, hydroxides and nitrates. The precursor should be used in an amount sufficient to produce the barium oxide in an amount ranging from about 10 mole % to about 50 mole % in excess of stoichiometric amount and $ZrO_2$ in or about stoichiometric amount.

The present $BaZrO_3$ powder is an off-white color with a yellowish tinge. It is a fine fluffy powder substantially in the form of individual crystals. The individual crystallites have a spherical equivalent average diameter ranging up to 0.15 micron in size.

The present $BaZrO_3$ powder can be prepared free of impurities or free of significant impurities. Therefore, when the same procedure is used, its properties are reproducible from batch to batch.

The present powder has a number of uses, one being as the matrix for the electrolyte in a molten carbonate fuel cell. The matrix can be produced, for example, by pressing the powder at room temperature in a die under pressures which will produce the pressed body or matrix of desired size and porosity. The fuel cell application is unique in that there is a recognized benefit in utilizing a powder having a spherical equivalent average diameter below 0.15 micron. This benefit is that greater volume fractions of liquid electrolyte can be maintained under proper conditions at cell operating temperatures, thereby reducing the electrical resistance of the cell to yield improved overall performance.

To produce fired polycrystalline bodies with densities of at least about 85% of theoretical density, the present $BaZrO_3$ powder can be pressed or otherwise shaped into a green body of desired size and fired at temperatures below its melting point in an oxygen-containing atmosphere such as air. Alternatively, the powder can be hot-pressed in an oxide die, preferably an alumina die press at temperatures of about 1573K to 1673K under a pressure of at least about 6000 psi to produce a hot pressed product having a density higher than 95% of theoretical density. These fired or hot pressed products are useful, for example, as dielectric materials for capacitors and electrical circuits.

The invention is further illustrated by the following examples:

EXAMPLE 1

Six runs were carried out which did not differ significantly except in the amount of $Ba(NO_3)_2$ used.

Specifically, in each run, 0.1909 kg (stoichiometric amount) of $Ba(NO_3)_2$ and a certain amount of excess $Ba(NO_3)_2$ given in Table I were used. The $Ba(NO_3)_2$ was reagent grade and ranged in size up to about 1000 microns. Also, 0.08911 kg (stoichiometric amount) of reagent grade $ZrO_2$ ranging in size up to about 100 microns, 107.2 ml of a 50 wt % aqueous NaOH solution and 0.13193 kg of KOH (88.5 wt % pure) were used.

The KOH was dissolved in the NaOH solution with 100 ml distilled water added thereto. The $Ba(NO_3)_2$ and $ZrO_2$ were added to about 500 ml distilled water in a stainless steel food processing blender jar and the slurry was intensively mixed/communited for 60 seconds. The slurry was then transferred to a Telfon vessel. The hydroxide solution was added to the slurry with vigorous stirring at room temperature and mixing was continued for 20 minutes. The resulting reaction mixture was reduced to dryness by heating at 523K with occasional stirring.

The dried material was heated at a rate of 100K per hour to 1133K where it was held for 5 hours in an air atmosphere while contained in covered, dense $\alpha$-$Al_2O_3$ crucibles and then left to cool to room temperature.

To retrieve the product, the cooled mass was placed in 23 liters of distilled water made acid with acetic acid to a pH ~5-6 room temperature and disintegrated by dissolution of the hydroxides to yield a dispersion of the product powder in an acetate solution. The product was collected by filtration, washed on the filter, dried and analyzed.

Each of the six runs is illustrated in Table I.

The product of each run of Table I was off-white in color with a yellowish tinge. X-ray diffraction phase analysis of the product of each run showed it to be phase pure $BaZrO_3$. BET surface area measurements of the product of each run were made and are given in Table I along with the corresponding spherical equivalent average crystal diameter.

By spherical equivalent average crystal diameter it is meant that assuming it is the diameter of a sphere which has the same surface area as that actually measured for the crystal. Specifically, it is calculated by dividing 6 l by the density of $BaZrO_3$, 6.23 g/cc, then divided again by the measured specific area in meters square/gram.

TABLE I

| Sample | $\dfrac{\text{Moles Excess } Ba^{+2}}{\text{Moles } BaZrO_3}$ | Mole % $Ba(NO_3)_2$ in excess of stoichiometric | Solvent $Ba^{+2}$ Content in NaK(OH) (mol %)[2] | $BaZrO_3$ Specific Surface Area ($M^2g^1$) | Spherical Equivalent Average Crystal Diameter ($\mu m$) | Pore Volume of Pressed Powder (%) |
|---|---|---|---|---|---|---|
| 15-A | 0.02 | 2 | 0.69 | 3.00 | 0.321 | 57.99 |
| 15-B | 0.10 | 10 | 3.36 | 7.22 | 0.133 | — |
| 15-C | 0.20 | 20 | 6.50 | 14.07 | 0.068 | 64.86 |

TABLE I-continued

| Sample | Moles Excess $Ba^{+2}$ / Moles BaZrO₃ | Mole % Ba(NO₃)₂ in excess of stoichiometric | Solvent $Ba^{+2}$ Content in NaK(OH) (mol %)² | BaZrO₃ Specific Surface Area (M²g¹) | Spherical Equivalent Average Crystal Diameter (μm) | Pore Volume of Pressed Powder (%) |
|---|---|---|---|---|---|---|
| 15-D | 0.30 | 30 | 9.44 | 29.31 | 0.033 | 70.33 |
| 15-E | 0.40 | 40 | 12.20 | 30.61 | 0.031 | — |
| 15-F | 0.50 | 50 | 14.80 | 55.15 | 0.017 | 74.51 |

Table I shows the pronounced effect of $Ba^{+2}$ content on product crystallite size. In Table I, samples 15-B, -C, -D, -E and -F illustrate the present invention.

In four of the runs the resulting powder was compressed in a stainless steel die at room temperature under a pressure of 14 MPa. The pore volume of each resulting compact is given in Table I. The effect of crystal size on compact interstitial void volume is graphically demonstrated, i.e. the pore volume increased significantly as the crystallite size was reduced.

The compacts of Samples 15-C, -D and -F would be useful as matrices in a molten carbonate fuel cell.

EXAMPLE 2

The procedure and materials used in this example were the same as in Example 1 except that only one run was carried out using Ba(NO₃)₂ in an amount of 30. mole % in excess of stoichiometric. The dried reacton mixture was divided into several aliquot, at times, for manageability.

The reaction was carried out at 1118K for 5 hours.

The BaZrO₃ product was retrieved in the same manner as the retrieval disclosed in Example 1.

The product was an off-white powder. X-ray diffraction phase analysis of the product showed the material to be phase pure BaZrO₃. B.E.T. surface area measurement of the product gave a value of 23.60 meters² gram⁻¹, which corresponds to a spherical equivalent average crystal diameter of ~0.041 micron.

The powder was pressed into a compact in the same manner as disclosed in Example 1. The compact pore volume fraction was 68.19% and it would be useful as a matrix for the electrolyte in a molten carbonate fuel cell.

The following copending U.S. patents and applications are assigned to the assignee here of and are incorporated herein by reference:

U.S. Pat. No. 4,152,281 entitled MOLTEN SALT SYNTHESIS OF LEAD ZIRCONATE TITANATE SOLID SOLUTION POWDER to Arendt et al. discloses that sodium chloride and/or potassium chloride is added to an aqueous suspension of the oxides of lead, titanium and zirconium and stirred until the suspension converts to a gel which is then heated evaporating the water and melting said chloride in which the oxides dissolve and react precipitating lead zirconate titanate.

U.S. Pat. No. 4,152,280 to Arendt et al. entitled MOLTEN SALT SYNTHESIS OF MODIFIED LEAD ZIRCONATE TITANATE SOLID SOLUTION POWDER discloses that sodium chloride and/or potassium chloride is added to an aqueous suspension of the oxides of lead, titanium, zirconium and cationic modifier and stirred until the suspension converts to a gel which is then heated, evaporating the water and melting said chloride in which the oxides dissolve and react precipitating modified lead zirconium titanate.

U.S. Pat. No. 4,201,760 to Arendt et al. entitled MOLTEN SALT SYNTHESIS OF LITHIUM META-ALUMINATE POWDER discloses a process consisting essentially of forming a mixture of an alkali chloride solvent salt, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma-alumina and mixtures thereof and heating said mixture to melt the chloride salt solvent in which the lithium and aluminum salt reactants dissolve and react precipitating lithium meta-aluminate.

U.S. Pat. No. 4,234,558 to Arendt et al. entitled MOLTEN SALT SYNTHESIS OF ORTHORHOMBIC LEAD METANIOBATE POWDER discloses a process consisting essentially of forming a mixture of lead oxide, niobium pentoxide and an alkali chloride salt solvent and heating said mixture to melt the chloride salt solvent in which the lead oxide and niobium pentoxide dissolve and react precipitating orthorhombic lead metaniobate.

U.S. Pat. No. 4,234,436 to Arendt et al. entitled MOLTEN SALT SYNTHESIS OF MODIFIED ALKALI NIOBATE POWDERS discloses a process consisting essentially of forming a mixture of niobium pentoxide, an oxide of sodium, potassium, or mixtures thereof, an oxide of lead, cadmium or mixtures thereof, and an alkali chloride salt solvent, and heating said mixture to melt the chloride salt solvent in which all of the oxides dissolve and react precipitating modified alkali niobate.

U.S. Pat. No. 4,234,557 to Arendt et al. entitled MOLTEN SALT SYNTHESIS OF ALKALI NIOBATE POWDERS discloses a process consisting essentially of forming a mixture of niobium pentoxide, an oxide of an alkali selected from the group consisting of sodium, potassium, lithium and mixtures thereof, and an alkali chloride salt solvent, and heating said mixture to melt the chloride salt solvent in which the niobium oxide and alkali oxide dissolve and react precipitating the alkali niobate.

U.S. Pat. No. 4,233,282 to R.H. Arendt entitled MOLTEN SALT SYNTHESIS OF BARIUM AND/OR STRONTIUM TITANATE POWDER discloses a process consisting essentially of forming a mixture of an alkali chloride solvent salt, titanium oxide and an alkaline earth reactant selected from the group consisting of barium oxide, strontium oxide, and mixtures thereof, and heating said mixture to melt the chloride salt solvent in which the titanium oxide and alkaline earth reactant dissolve and react precipitating a titanate selected from the group consisting of barium titanate, strontium titanate and mixtures thereof.

What is claimed is:

1. A process for producing BaZrO$_3$ powder consisting essentially of providing barium oxide in an amount ranging from about 10 mole % to about 50 mole % in excess of stoichiometric amount or precursor therefor, providing zirconium oxide in about stoichiometric amount or precursor therefor, providing an alkali metal hydroxide selected from the group consisting of sodium hydroxide, potassium hydroxide and mixtures thereof, forming a mixture of said barium oxide or precursor therefor, said zirconium oxide or precursor therefor and said hydroxide solvent, heating said mixture to a reaction temperature ranging from about 980K to about 1375K, said hydroxide solvent being molten at said reaction temperature and in molten form being a solvent for said barium oxide and said zirconium oxide, said hydroxide solvent being used in an amount of at least about 20% by weight of the total amount of said reactants and said hydroxide solvent, each said precursor decomposing completely at or below said reaction temperature to form said oxide and by-product gas, maintaining said reaction temperature dissolving and reacting barium oxide and zirconium oxide in said molten solvent and precipitating BaZrO$_3$ and recovering said precipitated BaZrO$_3$.

2. The process according to claim 1 wherein said hydroxide solvent is a mixture comprised of sodium hydroxide and potassium hydroxide.

3. The process according to claim 2 wherein said mixture is comprised of 50 mole % sodium hydroxide and 50 mole % potassium hydroxide.

* * * * *